3,834,935
ETHOXYLATED POLYBUTYLENE GLYCOLS AS FIBER LUBRICANTS

Richard H. Symm and Benny G. Barron, Lake Jackson, Tex., assignors to The Dow Chemical Company, Midland, Mich.
No Drawing. Filed May 1, 1972, Ser. No. 248,959
Int. Cl. C10m 3/14
U.S. Cl. 117—138.8 B   5 Claims

ABSTRACT OF THE DISCLOSURE

Valuable fiber lubricants are compounds of the formula $$Y[(C_4H_8O)_n-(C_2H_4O)_m-H]_x$$

wherein Y is the residue formed by the removal of $x$ atoms of active hydrogen from an initiator compound $YH_x$, $x$ is an integer 1–5, $n$ is an integer at least 2, such that the total oxybutylene content, $nx$ moles, is about 6–50 and $m$ is an integer, at least 1, such that the total oxyethylene content, $mx$ moles, is about 2–200 or more, $n$ and $m$ being so chosen that the oxyethylene content constitutes about 20–75% by weight of the total oxyalkylene content. They are especially useful as lubricants for synthetic fibers, such as polyester, polyamide and acrylic fibers.

BACKGROUND OF THE INVENTION

Polyglycols have been used for general lubricant purposes, including the lubrication of textile fibers. Insofar as we are aware, however, the latter usage has been limited to the polymers of propylene oxide and the heteric (random) copolymers of ethylene and propylene oxides. For example, Pat. 3,338,830 discloses fiber lubricants containing, as one of several essential components, a heteric copolymer of ethylene and propylene oxides. Pat. 2,841,479 discloses a diether of a heteric copolymer of ethylene and butylene oxides and suggests its use as a lubricant for internal combustion engines, though the use of propylene oxide instead of butylene oxide is said to be preferred because of better thermal stability.

Compounds suitable for use in the present invention are described and claimed in Pat. 2,828,345, though the only uses suggested are in the area of surfactants, emulsifiers and dispersing agents.

SUMMARY OF THE INVENTION

According to the invention, exceptionally desirable results are obtained by the use of monoethers of polyoxybutylene-polyoxyethylene glycols as lubricants for synthetic fibers. While such compounds can be made by various methods, it is convenient to regard them as the product of the sequential condensation of butylene oxide and ethylene oxide with an initiator having from 1 to 5 active hydrogen atoms. Thus, the preferred compounds are those of the formula $$Y[(C_4H_8O)_n-(C_2H_4O)_m-H]_x$$

wherein Y is the residue formed by removal of $x$ atoms of active hydrogen from an initiator, $x$ is an integer 1–5, $n$ is an integer, at least 2, such that the total oxybutylene, content, $nx$ oxybutylene groups, is about 6–50, and $m$ is an integer, at least 1, such that the oxyethylene content of the entire compound, $mx$ oxyethylene groups, constitutes about 20–75% by weight of the total oxyalkylene content.

The above compounds are effective lubricants for synthetic fibers, especially those of the polyester, polyamide and polyacrylic types. They have exceptional heat stability at the usual temperatures at which such fibers are drawn and crimped, e.g., 200–230° C. By appropriate choice of initiator and variation of the oxybutylene content and oxybutylene/oxyethylene ratio, the hydrophilicity of the product can be accurately controlled over a wide range from water-soluble through self-dispersibility to water-insolubility, thus adapting the product for various uses.

DETAILED DESCRIPTION OF THE INVENTION

As indicated above, it is convenient to regard the lubricants as being made up of three constituents:

(1) The initiator moiety, Y, derived from an initiator, $YH_x$, (2) An oxybutylene portion, $(C_4H_8O)_n$, usually formed by condensing $nx$ moles of butylene oxide with the initiator, thus to form a "base" compound, $$Y[(C_4H_8O)_n-H]_x, \text{ and}$$

(3) An oxyethylene portion, $(C_2H_4O)_m$, usually formed by condensing the base compound with $mx$ moles of ethylene oxide.

The initiator can be substantially any compound having 1–5 active hydrogen atoms, of which a great variety are well known in the polyether-polyol (polyglycol) art. Among the more common ones are the alcohols, amines, phenols, glycols, glycerol, pentaerythritol, etc. A wide variety of suitable initiators and general procedures for making the products are illustrated, for instance, in U.S. Pats. 2,674,619 and 2,677,700. Of course, the propylene oxide there used must be replaced with butylene oxide to make the compounds here contemplated. Pat. 2,828,345 describes compounds useful in the present invention and others can be made by the same general methods by appropriate choice of initiator and of amounts and proportions of butylene and ethylene oxides.

In general, the preferred initiators are those having up to 3 active hydrogen atoms and a total of not more than 20 carbon atoms and free of elements other than C, H, O and N. Among these preferred compounds are the alkylene glycols, polyalkylene glycols, alkanols, alkenols, phenols, alkylphenols, alkylamines, alkanolamines and glycerol.

The oxybutylene moieties of the compounds are preferably derived from 1,2- or 2,3-butylene oxide or mixtures thereof, though some or all of it may be isobutylene oxide. In fact, the compounds may include a minor proportion of oxypropylene moieties as a replacement for a corresponding portion of the oxybutylene and/or oxyethylene moieties.

The most preferred compounds are those initiated by alkylene glycol wherein the oxybutylene content amounts to about 40–60% by weight of the total oxyalkylene content, is made up predominantly of oxy-1,2-butylene groups, and contributes about 500–3000 to the molecular weight of the compound.

The lubricants can be applied to the fibers to be lubricated in any convenient manner, e.g., oils in a trough, waxes from a block, both without dilution. Since only a very small amount is needed (typically 0.1–1% by weight, based on the fiber), it is convenient to dilute the lubricant by dissolving or dispersing it in water or other diluent. It may then be applied by spray, immersion or other techniques.

While the compounds of the invention are exceptionally stable at the temperatures used in processing synthetic fibers, conventional stabilizers and antioxidants may be added if desired. Suitable such additives include Ionol, bisphenol A and especially, the anioxidants disclosed by Lloyd in U.S. Pat. 3,146,272, these being the oxyalkylation products of conventional antioxidants such as phenols and aromatic or heterocyclic amines.

SPECIFIC EMBODIMENTS

In the following examples, the lubricants were tested for lubricity, heat stability and their swelling effect on polyurethane elastomer such as is commonly used in cots and aprons of texturizing equipment. These tests were conducted as follows:

Lubricity

Aqueous solutions, dispersions or emulsions of the lubricants were applied to scoured 150/34 polyester filament producer yarn (drawn) to give about 0.5% lubricant on the yarn. The lubricants were applied to the yarn on an apparatus in which the yarn is passed over a capillary tube through which the lubricant solution, dispersion, or emulsion is metered from a syringe pump, then over a heated drum for removal of water, and finally onto a winding tube. The treated yarn was conditioned overnight of 60% relative humidity and 24° C. before being tested.

The coefficients of friction ($f$) of the treated yarn were determined at room temperature by passing the yarn over a ¼ inch diameter polished chrome pin using a contact angle of 180° and yarn speeds of 100 and 300 meters per minute. Tensiometers measured the yarn tension before and after it was passed over the friction pin. The prefriction tension ($T_1$) was maintained at a constant value of 15 g. by use of a controllable magnetic brake. The $f$ values are calculated from the formula $$f = \frac{1}{\theta}(\ln T_2 - \ln T_1),$$

where $\theta$ = contact angle in radians
$T_1$ = input tension in grams (constant at 15 g.)
$T_2$ = output tension in grams

Heat Stability

The heat stability of the copolymer lubricants were determined by weighing 5 g. of the copolymer into an aluminum weighing dish, and placing the dish on a hot plate regulated at 215±3° C. for a period of 24 hours. The dish was then removed and reweighed for determination of percent weight loss. The physical state of the heating residue and its solubility in water were noted. The nature of the residue is more important than the heat stability *per se*. Any residue preferably should be liquid and water-soluble or water-dispersible to facilitate its removal from texturizing apparatus and other heated surfaces upon which it collects.

Swelling of Polyurethane

The swelling effect of the lubricants on polyurethane elastomers such as is commonly used in cots and aprons on texturizing equipment was determined by immersing a piece of the elastomer in the lubricant maintained at 60±2° C. The elastomer was removed, blotted, and weighed at the end of 24 and 200 hours. The weight increase of the elastomer was used to indicate the degree of swelling. In this study the elastomer used was Armstrong Cork Company number P0650 roller covers; the pieces used weighed 0.3–0.4 g., and were ³⁄₃₂ in. thick, ⁷⁄₁₆ in. long and ¼ in. wide.

Examples 1 and 2

Two typical compounds of the invention were evaluated in the above-described tests. The lubricants were made as follows:

Lubricant A

Commercial butylene oxide (approximately 97% or more 1,2-, the remainder being essentially 2,3-) was condensed with the initiator, propylene glycol, until a base compound of molecular weight 912 was obtained. The base compound was then condensed with ethylene oxide until the final product contained 71% by weight, of oxyethylene groups based on combined oxybutylene and oxyethylene content.

Lubricant B

This product was made in the same way as Lubricant A except that the molecular weight of the base compound was 2000 and the oxyethylene content was 51%.

Lubricants A and B were tested as described above, with the following results:

| Test | Lubricant A | Lubricant B |
|---|---|---|
| Lubricity friction, ($f$), at— | | |
| 100 m./min | 0.64 | 0.61 |
| 300 m./min | .63 | .62 |
| Heat stability: | | |
| Weight, loss, percent | 69 | 47 |
| Residue, physical state water solubility | Liquid soluble | |
| Swelling of polyurethane, weight gain, percent: | | |
| 24 hours | 2.5 | 0.0 |
| 200 hours | 11.0 | 2.0 |

We claim:

1. Synthetic textile fibers having on their surface a lubricating amount of a compound of the formula $$Y[(C_4H_8O)_n-(C_2H_4O)_m-H]_x$$

wherein Y is the residue formed by the removal of $x$ atoms of active hydrogen from an initiator having a total of not more than 20 carbon atoms and free of elements other than C, H, O and N and being selected from the group consisting of alkylene glycols, polyalkylene glycols, alkanols, alkenols, phenols, alkylphenols, alkylamines, alkanolamines and glycerol, $x$ is an integer 1–5, $n$ is an integer, at least 2, such that the total oxybutylene content, $nx$ oxybutylene groups, is about 6–50, and $m$ is an integer, at least 1, such that the oxyethylene content of the entire compound, $mx$ oxyethylene groups, constitutes about 20–75% by weight of the total oxyalkylene content.

2. The fibers of Claim 1 wherein Y is the residue of an alkylene glycol.

3. The fibers of Claim 1 wherein the oxybutylene moieties of the lubricating compound consist predominantly of oxy-1,2-butylene moieties.

4. The fibers of Claim 1 wherein the fibers are polyester fibers.

5. The fibers of Claim 1 wherein the lubricated fibers are polyester, polyamide or polyacrylic fibers.

References Cited
UNITED STATES PATENTS

| | | | |
|---|---|---|---|
| 2,828,345 | 3/1958 | Spriggs | 260—615 B |
| 2,964,470 | 12/1960 | Wentworth | 117—139.5 F |
| 3,161,594 | 12/1964 | White et al. | 252—8.9 X |
| 3,338,830 | 8/1967 | Stokes et al. | 252—8.9 |

WILIAM D. MARTIN, Primary Examiner

T. G. DAVIS, Assistant Examiner

U.S. Cl. X.R.

117—138.8 F, 138.8 N, 138.8 UA, 139.5 CQ

PO-1050
(5/69)

UNITED STATES PATENT OFFICE
CERTIFICATE OF CORRECTION

Patent No. 3,834,935          Dated September 10, 1974

Inventor(s) Richard H. Symm, Benny G. Barron

It is certified that error appears in the above-identified patent and that said Letters Patent are hereby corrected as shown below:

Column 1, line 63, after tylene delete the --,--;

Column 4, line 23, under Lubricant - column B, beneath the number 47 insert the words ---Liquid soluble---.

Signed and sealed this 24th day of December 1974.

(SEAL)
Attest:

McCOY M. GIBSON JR.
Attesting Officer

C. MARSHALL DANN
Commissioner of Patents